Aug. 18, 1936.                J. R. PAMPLIN                2,051,343
                                 RAZOR
                          Filed June 10, 1935
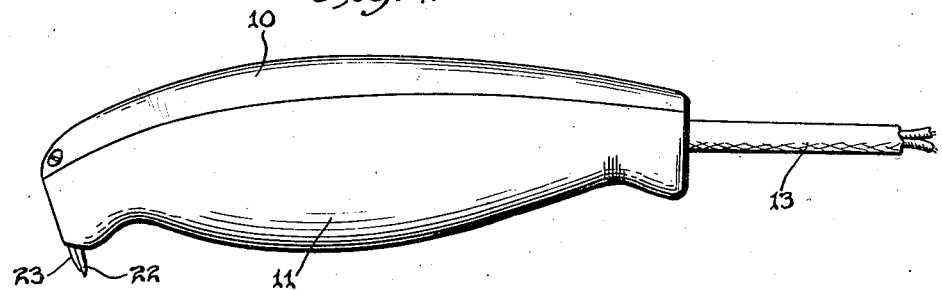
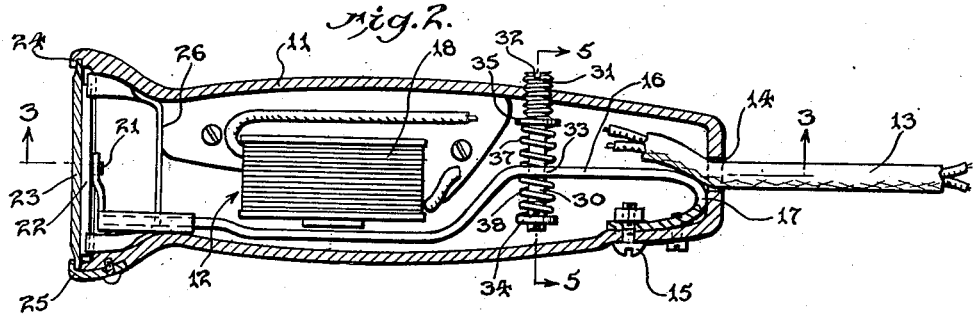
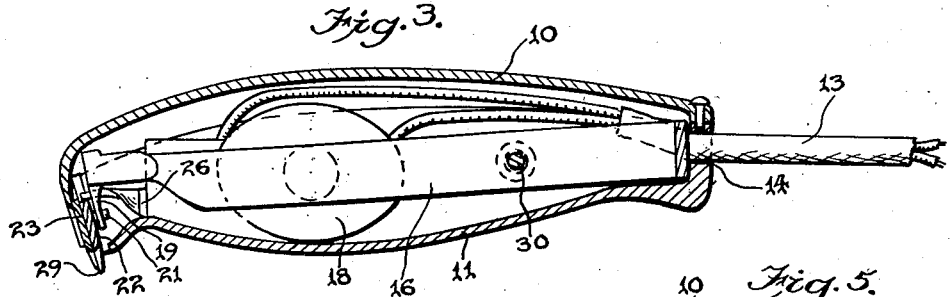
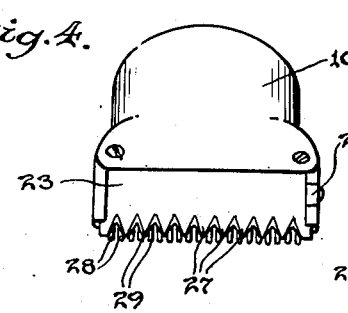
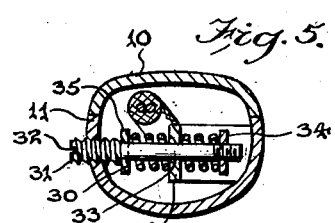
INVENTOR
James Robert Pamplin,
BY
ATTORNEY Patented Aug. 18, 1936

2,051,343

UNITED STATES PATENT OFFICE 2,051,343

RAZOR

James Robert Pamplin, Springfield, Mo.

Application June 10, 1935, Serial No. 25,915

6 Claims. (Cl. 30—43)

This invention relates to razors and particularly a motor operated razor of the general type disclosed in my United States Patent No. 1,929,711, granted October 10, 1933.

While containing many of the features of that invention, it is an object of the present invention to provide novel blades and a simple adjusting means for the same.

Other novel features will become apparent from a reading of the following specification and will be particularly pointed out in the appended claims.

Referring to the drawing,

Figure 1 is a side elevational view of the completely assembled device.

Figure 2 is a longitudinal sectional view of the same,

Figure 3 is a view taken substantially along line 3—3 of Figure 2,

Figure 4 is a plan view of the assembled razor,

Figure 5 is a view taken substantially along line 5—5 of Figure 2 and

Figure 6 is an enlarged fragmentary view of the blades utilized in the invention.

Referring more particularly to the drawing, there is shown therein a mechanically operated razor having a casing consisting of a back portion 10 and a front portion 11. It will be seen that the casing is so shaped as to easily fit the hand of the user. Suitably mounted within the front portion of the casing is an electrically operated vibrator mechanism generally indicated at 12 connected by means of a cable 13 which passes through an opening in the bottom of the lower portion of the casing 11 as indicated at 14.

Attached by means of a nut and bolt 15 or the like, within the lower end of the casing is a vibrator arm 16, which extends downwardly to a point adjacent the bottom wall of the casing as indicated at 17 and thence upwardly longitudinally of the casing in cooperative relation with an electromagnetic coil 18 of conventional design. The arm 16 continues to a point adjacent the upper end of the casing where it terminates in a forwardly extending arm as shown at 19, which is swivelly connected to a pin 21, preferably formed integral with a movable blade 22, which is in coactive engagement with a stationary blade 23 which is held in position by means of a groove 24 cut in one side of the casing and a clamp 25 at the opposite side of the casing. A U-shaped arm 26 holds the blade 22 in parallelism with the blade 23.

The outer or stationary blade is formed of very thin material and is provided with a series of teeth 27, the edges or blades of which extend at angles of 45 degrees from the longitudinal edge of said blade. The edges of the teeth 27 are bevelled on the outer surface to form a continuous cutting edge. Being bevelled in this manner allows the skin of the user to come in contact with the cutting edge of the stationary blade throughout its length whereby a shaving action is obtained by blade 23. The movable blade is provided with a series of closely aligned parallel blades 28 having blunted ends or tips 29 which extend for a short distance beyond the outer ends of the teeth of the stationary blade. The movable blade being in contact with the stationary blade, its teeth extending beyond the points of the teeth of the stationary blade and being so closely aligned as to prevent the skin from entering between the teeth prevents the skin of the user from being cut. It will be observed that the purpose of the blade 23 is to shave and that its entire cutting edge is allowed to contact the skin in a shaving manner while blade 22 is for the purposes of preventing the skin from being cut by blade 23 and for assisting in the shaving action of blade 23 by forcing the hair against the shaving edge of blade 23. The parallel teeth of blade 22 while being so closely aligned as to prevent the skin from entering between them they will permit the hair to enter between and allow it to reach the shaving edge of blade 23.

A stroke regulating means is provided which consists of a shaft 30 threaded into the lower portion of the casing as indicated at 31 and having a conventional screw slot 32 in its outer end. The shaft 30 extends into the casing to a point near the opposite side thereof, passing through an opening 33 in the arm 16 and terminating in a dog 34. A dog 35 is provided adjacent the threaded portion 31 and springs bear against the dogs 35 and 34 respectively and against opposite sides of the arm 16.

In operation all that is necessary is to switch on the source of current, grasp the casing in the hand and use in the manner of the conventional safety razor. It will be seen that the solenoid 18 will cause a reciprocal movement of the vibrator arm 16, and consequently a reciprocal movement of the movable blade 22 and that the blunt ends of the teeth 28 will act as a guard for the stationary blade 23 and that shearing action will take place between the teeth 27 and 28 due to the fact that the teeth 28 are at angles of 45 degrees to the edges of the blades 27.

It will be apparent that the regulating means operates by holding the vibrator arm 16 at varying distances from the solenoid 18, yet allows movement of the same due to the fact that the springs 37 and 38 retain an operative relation in respect to the arm 16 and without any alteration in the spring tension. In this manner, the stroke of the movable blade may be easily regulated by means of the threaded portion 31 of the shaft 30. It will be noted that any adjustment of the screw 31 changes the point of equilibrium of the arm 16 whereby the arm is brought into a closer or more distant relation to the solenoid 18 to produce a shorter or longer stroke of the blade 22. The dog 34 is threaded and coacts with the threaded terminal of the shaft 30 whereby the tension of the opposed springs may be adjusted in relation to each other.

It is to be understood that the form of the invention herewith shown and described is to be taken as a preferred example of the same, and that various changes in the shape, size, and arrangements of parts may be resorted to without departing from the spirit of the invention or the scope of the appended claims.

What is claimed is:

1. A razor having a thin stationary blade provided with cutting teeth having edges at 45 degree angles to the blade, said teeth being beveled to a shaving edge throughout their contour, and a movable blade having parallel teeth in frictional engagement therewith.

2. A razor having a thin stationary blade provided with cutting teeth having edges at 45 degree angles to the blade, said teeth being bevelled to a shaving edge throughout their contour, and a movable blade having parallel teeth in frictional engagement therewith, the latter teeth being provided with blunt ends for contact with the skin of the user for protecting the same from the first mentioned blades.

3. A razor having a thin stationary shaving blade for contacting the skin, said blade being provided with cutting teeth having edges at 45 degree angles to the blade, said blade being bevelled on the skin contacting side whereby the skin of the user may contact the shaving edge through the length of the blade, a movable blade having parallel teeth in frictional engagement therewith and means for reciprocating said movable blade, said means including a vibrator arm and a solenoid for actuating the same, means for adjusting the oscillation of said arm including opposed spring members bearing in opposite directions in a restraining manner against the vibratory movement of the said vibrator arm and adjusting means for tightening the tension of one of the spring members while simultaneously loosening the tension of the other spring member to bring the vibrator arm in a closer or more distant operative relation to said solenoid and means for tightening the tension of the opposed springs in relation to each other.

4. A razor having a thin stationary outer shaving blade, said blade having a toothed shaving edge, said blade having a plane inner surface and having its outer surface bevelled at its toothed shaving edge, said toothed shaving edge having pointed teeth whose edges are at angles with each other, said edges having bevelled outer surfaces to form continuous cutting edges, a movable blade having narrow, closely aligned, parallel blunt ended teeth, said last named blade being in frictional engagement with the plane upper side of said shaving blade, the teeth of said movable blade projecting beyond the points of the teeth of said shaving blade, and means for longitudinally reciprocating said movable blade.

5. A razor having a thin stationary blade for contacting the skin, said blade being provided with a toothed shaving edge the teeth of which are provided with pointed outer ends and having cutting edges at angles of approximately 45 degrees to the longitudinal axis of the blade, said cutting edges being bevelled on the skin contacting side thereof, said blade being plane on its upper side, a movable blade in frictional contact with the plane upper side of said stationary blade, said movable blade being provided with closely aligned parallel teeth at angles of 90 degrees with said blade, said teeth having blunt outer ends and extending beyond the points of the teeth of said first mentioned blade, means for reciprocating said movable blade longitudinally of said stationary blade, said means including a vibrator arm and a solenoid for operating same, opposed spring members bearing in opposite directions against said vibrator arm to restrain the vibratory movement of said arm, adjusting means for tightening the tension of one of the spring members while simultaneously loosening the other spring member to bring the vibrator arm in a closer or more distant operative relation to said solenoid and means for tightening the tension of the opposed spring members in relation to each other.

6. Adjusting means for regulating the oscillation of the vibrator arm of a solenoid operated vibrator, said means comprising opposed resilient means bearing in opposite directions upon said vibrator arm to restrict the movement of said arm, adjusting means for tightening the tension of one of the opposed resilient means while simultaneously loosening the tension of the other resilient means to cause the vibrator arm to assume a closer or more distant relation to the solenoid and means for tightening the tension of the opposed resilient means in relation to each other.

JAMES ROBERT PAMPLIN.